(12) United States Patent
Farrington et al.

(10) Patent No.: US 6,927,987 B2
(45) Date of Patent: Aug. 9, 2005

(54) HALF-BRIDGE ISOLATION STAGE TOPOLOGIES

(75) Inventors: Richard Farrington, Heath, TX (US); Abram P. Dancy, Shrewsbury, MA (US); Leif E. LaWhite, Lebanon, NH (US); Martin F. Schlecht, Lexington, MA (US)

(73) Assignee: SynQor, Inc., Boxborough, MA (US)

( * ) Notice: Subject to any disclaimer, the term of this patent is extended or adjusted under 35 U.S.C. 154(b) by 0 days.

(21) Appl. No.: 10/293,961

(22) Filed: Nov. 13, 2002

(65) Prior Publication Data

US 2003/0123264 A1 Jul. 3, 2003

Related U.S. Application Data

(60) Provisional application No. 60/338,658, filed on Nov. 13, 2001, provisional application No. 60/372,621, filed on Apr. 12, 2002, and provisional application No. 60/406,272, filed on Aug. 27, 2002.

(51) Int. Cl.[7] .............................................. H02M 3/335
(52) U.S. Cl. .................................................. 363/56.02
(58) Field of Search ........................ 363/16, 17, 56.02, 363/131, 132

(56) References Cited

U.S. PATENT DOCUMENTS

| | | | |
|---|---|---|---|
| 4,060,757 A | 11/1977 | McMurray | |
| 4,301,496 A | 11/1981 | Schwarz | |
| 5,198,969 A | 3/1993 | Redl et al. | |
| 5,233,509 A * | 8/1993 | Ghotbi | 363/89 |
| 5,808,879 A * | 9/1998 | Liu et al. | 363/17 |
| 5,894,412 A * | 4/1999 | Faulk | 363/17 |
| 5,999,417 A | 12/1999 | Schlecht | |
| 6,222,742 B1 * | 4/2001 | Schlecht | 363/16 |
| 6,344,980 B1 * | 2/2002 | Hwang et al. | 363/21.01 |
| 6,567,284 B2 * | 5/2003 | Huang | 363/98 |
| 6,594,159 B2 * | 7/2003 | Schlecht | 363/16 |

FOREIGN PATENT DOCUMENTS

EP    0 851 566 A2    1/1998

* cited by examiner

*Primary Examiner*—Adolf Berhane
(74) *Attorney, Agent, or Firm*—Hamilton, Brook, Smith & Reynolds, P.C.

(57) ABSTRACT

Half-bridge isolation stage topologies are provided in power converters, dividing an input voltage between capacitors. Primary transformer windings are periodically switched across respective capacitors. In current-fed implementations, the current flow through the primary windings is constrained as by an inductive element. In some implementations, a capacitor, primary winding and switch are connected in series in different orders in each of plural legs across the input. Current feed circuitry includes a current constraining component connecting nodes within each of respective legs. The switches of the isolation stage may be turned on with a fixed duty cycle, and a secondary circuit may comprise synchronous rectifiers.

40 Claims, 8 Drawing Sheets

HALF-BRIDGE ISOLATION STAGE TOPOLOGIES

RELATED APPLICATIONS

This application claims the benefit of U.S. Provisional Application Nos. 60/338,658, filed on Nov. 13, 2001, 60/372,621, filed Apr. 12, 2002 and 60/406,272, filed Aug. 27, 2002. The entire teachings of the above applications are incorporated herein by reference.

BACKGROUND OF THE INVENTION

Reference is made to U.S. Pat. No. 5,999,417 (the '417 patent), the contents of which are hereby incorporated in this document.

The figures of the '417 patent depict power circuit topologies that have isolation stages. Some of these isolation stages are current-fed (for example, through an inductor as shown in FIG. 6A), and others are voltage-fed (for example, from a capacitor as shown in FIG. 6B). In addition, the examples of isolation stages depicted in the '417 patent also have the characteristic that the effective DC voltage seen at the input to an isolation stage (for example, the DC voltage, $V_B$, across capacitor $C_B$ in FIGS. 6A and 6B) is the output voltage multiplied by a transformer's primary/secondary turns ratio (assuming we ignore resistive drops). Furthermore, because a transformer is operated at about a 50% duty cycle, the primary side switches of the isolation stages depicted in the '417 patent are stressed to approximately $2V_B$ when they are off. (The actual voltage is slightly higher to insure that the transformer resets before the beginning of the next cycle.)

The '417 patent is not limited to these specific isolation stage topologies. Other topologies that exhibit the invention of that patent are also possible.

SUMMARY OF THE INVENTION

Depending on the application, it may be desirable to replace the isolation stage topologies shown in the '417 patent with their "half-bridge" versions in which the effective DC voltage seen at the input to the isolation stage is twice the output voltage multiplied by the transformer's turns ratio. In these half-bridge topologies, the primary side switches are stressed to approximately $V_B$, instead of $2V_B$, and the number of primary turns required on the transformer to achieve a given value of $V_B$ is half the number that is required in the example isolation stage topologies depicted in the '417 patent.

Both this lower voltage stress on the switches, and the lower number of primary turns in the transformer can be important.

For instance, great improvements have been made in the on-state resistance of MOSFETs that have an off-state voltage rating of 40V and below. If the desired value of $V_B$ is in the 25V to 30V range, the isolation stage topologies of the '417 patent cannot use these low voltage devices, but a half-bridge version of the isolation stage could.

Another example of where the half-bridge topology would be advantageous can be found in those DC/DC converters where the output voltage is low, relative to $V_B$, that the number of primary turns required for the isolation stage topologies of the '417 patent is difficult to implement in a transformer of a given size. A half-bridge version of the isolation stage would relieve this problem since only half the number of primary turns would be required.

Yet another instance where the lower number of primary windings is useful is in multiple output converters where there are two secondary windings in the transformer, one for each output voltage. Since the ratio of the two secondary windings is determined by the ratio of the two output voltages, these converters often have a very high number of secondary turns, and therefore a very high number of primary turns. If the number of primary windings is too high to implement easily, the factor of two reduction provided by the half-bridge version can be very useful.

Therefore, several isolation stage topologies that have the characteristics of a "half-bridge" topology are presented in this document. The various versions include topologies that are either voltage-fed or current-fed, and that have one or two transformers. The concepts and inventions described in the '417 patent apply to these isolation stage topologies in the same manner that they apply to the corresponding isolation stage topologies shown in the '417 patent. However, the present invention is not limited to such applications.

The preferred implementations are current-fed implementations in which an input voltage is divided across plural capacitors. Transformer primary windings are periodically switched across the capacitors and current flow through the primary windings is constrained. A secondary circuit is driven from the primary windings to provide an output.

A power converter implementing the method has an input which receives an input voltage and an input current from a DC source. Capacitors are connected across the input and divide the input voltage therebetween. Switches periodically switch transformer primary windings across respective capacitors, and current feed circuitry constrains current flow through the primary windings.

In certain implementations, two capacitors are connected across the input, each capacitor charging to about ½ the input voltage. Each of the switches conducts about twice the input current.

The transformer secondary windings of the secondary circuit may be loosely coupled or on separate transformers; that is, they are not tightly coupled.

The current feed circuitry may comprise at least one magnetic element such as an inductor or a transformer. The circuitry may include an inductor which receives the input current as well as another inductor connecting the two capacitors. Current through each primary winding may be constrained by a common component such as an inductor connecting the two windings. A clamp, such as a diode, may be coupled to each switch to limit voltage across the switch when the switch is turned off.

The primary circuitry may include a first circuit leg comprising a capacitor, transformer primary winding and switch connected in series across the input. A second circuit leg comprises a capacitor, transformer primary winding and switch connected in series across the input in an opposite order relative to the series connection of the first circuit leg. An inductor interconnects like nodes of the first and second circuit elements. The primary winding may be positioned between the capacitor and switch in each leg. In one embodiment, a current constraining inductor connects nodes between the primary winding and capacitor of each leg, while in another embodiment, the inductor connects nodes between the primary winding and switch of each leg.

The switches may be turned on with a fixed duty cycle. The secondary circuit may comprise synchronous rectifiers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
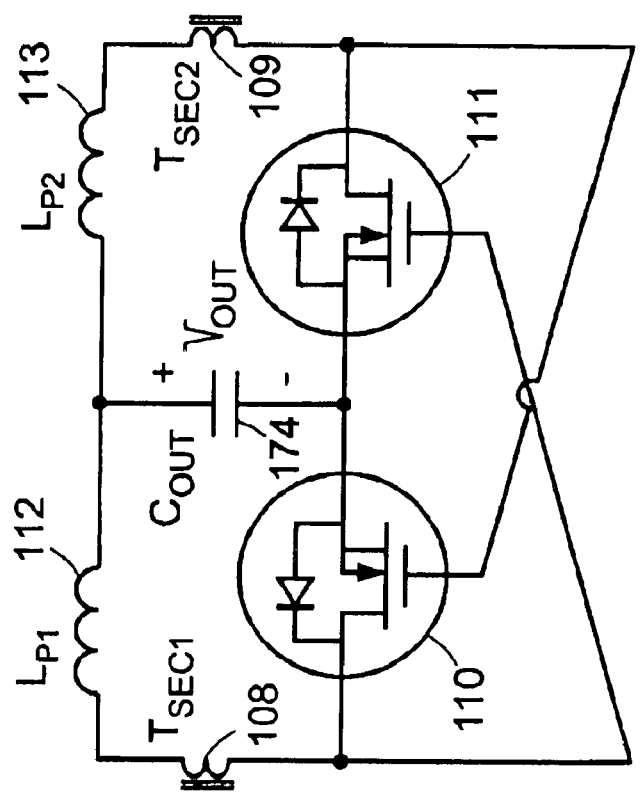
FIG. 1: A Single-Transformer, Voltage-Fed, Half-Bridge Isolation Stage Topology.
Figure 1:
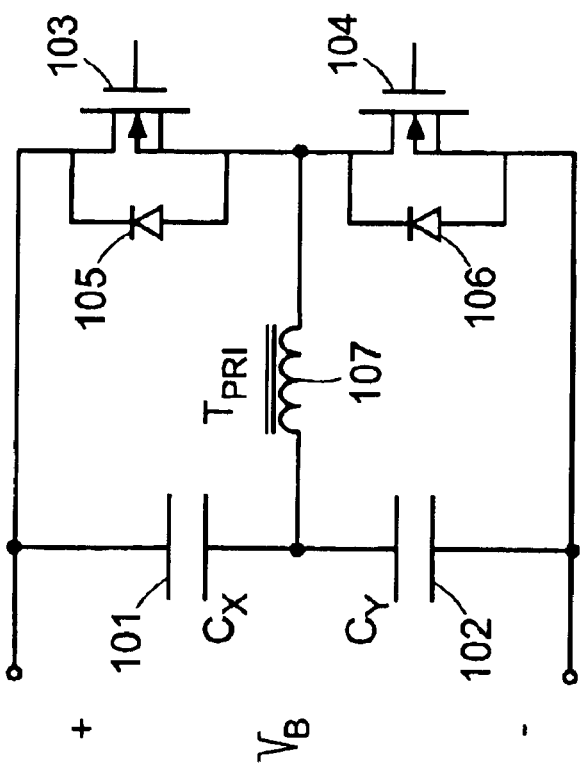

Half-bridge converters of the voltage-fed type are well known in the prior art. FIG. 1 shows a half-bridge version of a voltage-fed, single-transformer isolation stage. Two capacitors, 101 and 102, are placed in series. The midpoint of these two capacitors has a voltage equal to half the overall input voltage, $V_B$. The two switches 103 and 104 alternately connect the transformer's primary winding 107 across capacitor 101 and capacitor 102, each for 50% of the cycle. When switch 103 is turned on, the voltage across capacitor 101 (which equals $V_B/2$) is placed positively across the primary winding 107. When switch 104 is turned on, the voltage across capacitor 102 (which also equals $V_B/2$) is placed negatively across the primary winding.

When switch 103 is on and the voltage across the primary winding is positive, controlled rectifier 110 is also on, and current flows to the output through the first secondary winding 108. In the second half of the cycle when switch 104 is on, controlled rectifier 111 is also on, and current flows to the output through the second secondary winding 109.

At the switch transitions, there is a brief dead time when both switches must be off to avoid the shoot-through that would otherwise occur. Diodes 105 and 106, which may be the body diodes of switches 103 and 104, can carry the transformer's primary current during this dead time.

Normally, the two secondary windings in this topology are tightly coupled together. However, they can be made loosely coupled to each other, as indicated with the parasitic inductances 112 and 113 in FIG. 1, to achieve the advantages discussed in the '417 patent. A similar setup was shown in the topology of FIG. 9 of the '417 patent since it also used a single transformer.

Since the transformer's primary winding is exposed to only $V_B/2$, instead of $V_B$, the number of primary turns it requires is only half the number it would be for the isolation stage topologies shown in the '417 patent. Similarly, the switches, when they are off, are stressed to approximately $V_B$, instead of approximately $2V_B$. However, they carry twice the current when they are conducting because the primary winding has half the number of turns.

Figure 2:
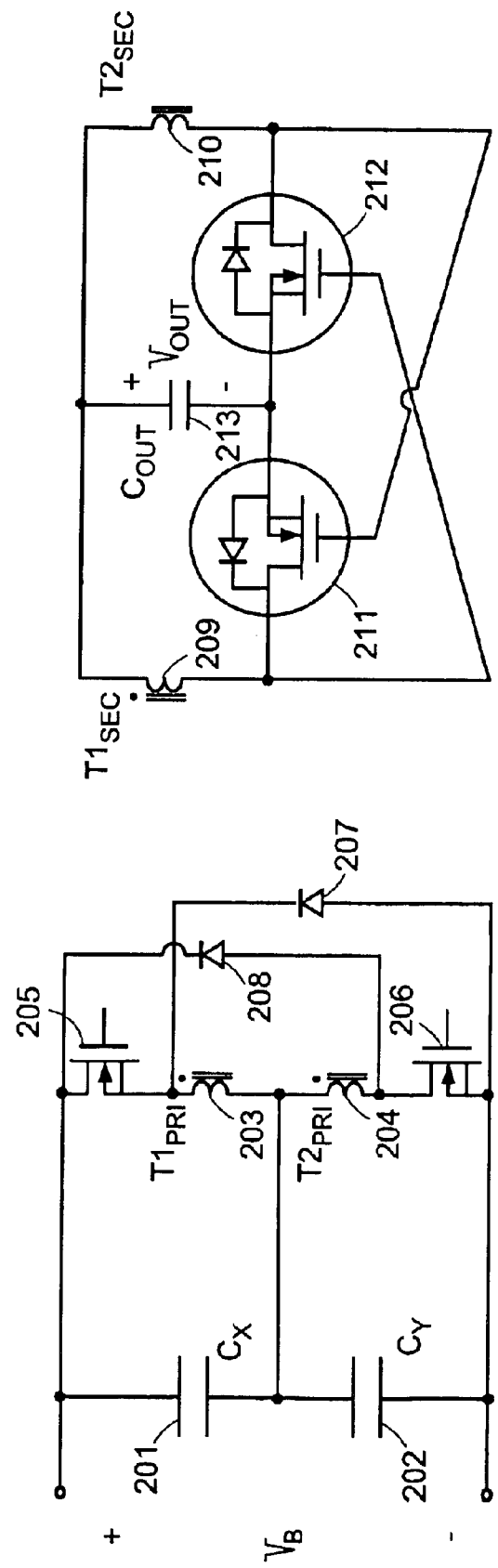
FIG. 2: A Two-Transformer, Voltage-Fed, Half-Bridge Isolation Stage Topology.

FIG. 2 shows one way to accomplish a half-bridge version of a voltage-fed, two-transformer isolation stage. In this topology, there are two capacitors 201 and 202 in series, each having a DC voltage of $V_B/2$ across it. In parallel with each capacitor is a series combination of a transformer's primary winding (203 or 204) and a switch (205 or 206). Each transformer has a secondary winding (209 or 210) that is connected to the output capacitor 213 through a synchronous rectifier (211 or 212).

For the first half of the cycle switch 205 is turned on, which connects the primary winding 203 across capacitor 201. Current flows into primary winding 203, and out of its corresponding secondary winding 209 to the output. Controlled rectifier 211 is turned on during this time because the secondary winding 210 has a negative voltage across it (as will be explained below) and therefore presents approximately $2V_{out}$ to the gate of 211.

Similarly, during the second half of the cycle switch 206 is turned on, which connects the primary winding 204 across capacitor 202. Current now flows into winding 204 and out of the secondary winding 210 to the output. Controlled rectifier 212 is turned on during this time because the winding 209 has a negative voltage across it.

During the half-cycle when switch 205 is off, the magnetizing current of transformer T1 flows through diode 207. With this diode turned on, the voltage across the transformer's primary winding 203 is $-V_B/2$, which permits the transformer to reset for the next cycle. This reset will occur slightly before the next cycle begins since the diode drop and resistive losses make the reverse voltage placed across the winding slightly higher than the forward voltage was. Similarly, transformer T2 is reset when its magnetizing current flows through diode 208.

At the switch transitions, there is a brief dead time when both switches must be off to avoid the shoot-through that would otherwise occur. Diodes 207 and 208 can carry the transformer's primary current during this dead time.

Since in this topology the primary windings of both transformers T1 and T2 are exposed to only $V_B/2$, instead of $V_B$, the number of primary turns they require is only half the number they would be for the isolation stage topologies shown in the '417 patent. Similarly, the switches 205 and 206, when they are off, are stressed to approximately $V_B$, instead of approximately $2V_B$. However, they carry twice the current when they are conducting because the primary winding has half the number of turns.

Figure 3:
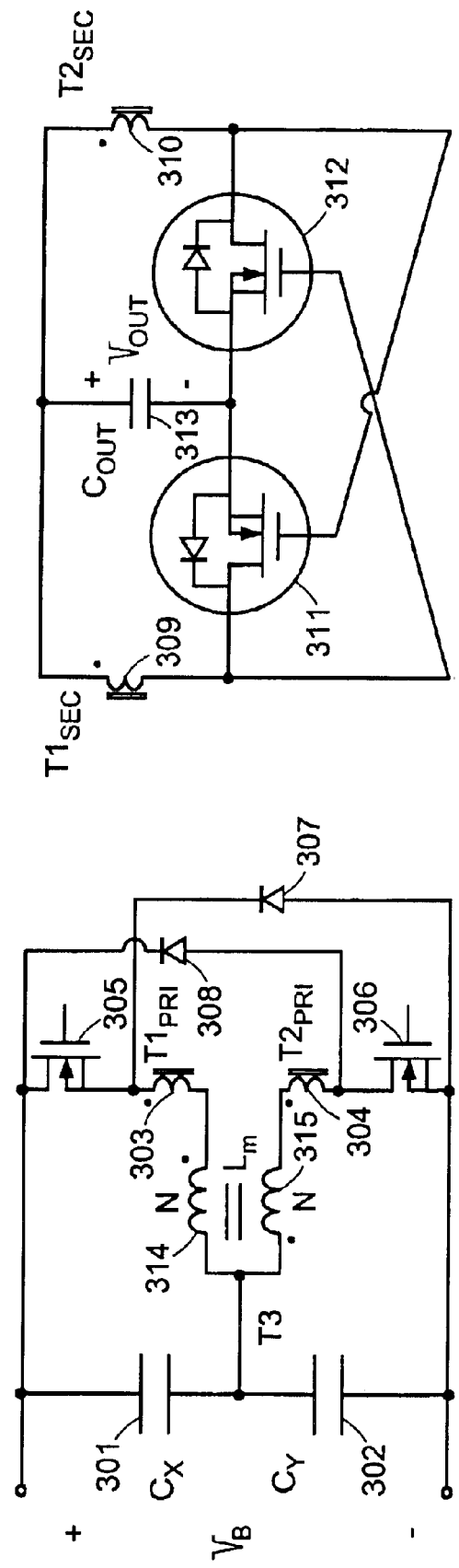
FIG. 3: A Two-Transformer, Current-Fed, Half-Bridge Isolation Stage Topology.

Although there are many examples of current-fed, transformer-based converters in the prior art, they do not exhibit the characteristics of a half-bridge topology. FIG. 3 shows one new way to accomplish a half-bridge version of a current-fed, two-transformer isolation stage. Once again, two capacitors 301 and 302 are placed in series across the input voltage, $V_B$. The DC voltage across each capacitor is $V_B/2$. Switch 305 is connected in series with the primary winding 303 of transformer T1 and switch 306 is connected in series with the primary winding 304 of transformer T2. These two pairs of series elements are then connected to different windings 314 and 315 of transformer T3, as shown in the figure. The other ends of T3's two windings are connected to the midpoint formed by capavitors 301 and 302.

The magnetizing inductance of transformer T3 provides the current-fed feature of this topology. It has a certain DC current flowing through it, just as do the inductors of the current-fed isolation stage topologies shown in the '417 patent. In this case, however, since the "inductor" has two windings, its current can flow through two paths, depending on the state of the isolation stage's switches.

Operation of this circuit is as follows. For the first half of the cycle, switch 305 is turned on and switch 306 is turned off. Transformer T3's magnetizing current flows through winding 314 and through the primary winding 303 of T1. This gives rise to a current flowing through the secondary winding 309 of T1 and the controlled rectifier 311. For the second half of the cycle, switch 306 is turned on and switch 305 is turned off, and the magnetizing current of T3 flows through winding 315 and the primary winding 304 of T2. Again, this current, reflected by the turns ratio of T2, flows through the secondary winding 310 and the controlled rectifier 312.

In both half cycles, the current that flows is dictated by the magnetizing inductance, $L_M$, of T3. Both transformers T1 and T2 (and their series switches) use the magnetizing inductance of T3 to provide the current-fed feature. The purpose of the transformer T3 structure is to allow the inductor controlled current to first flow one way (towards capacitors 301 and 302) and then the other way (from capacitors 301 and 302), depending on which primary side switch, 305 or 306, is turned on.

During the half cycle that a transformer is not delivering current to the output, it has a negative voltage across it to reset its core. For instance, during the first half cycle when switch 306 is off, the magnetizing current of transformer T2 flows through diode 308, which connects the bottom terminal of the primary winding 304 to the voltage $V_B$. The top terminal of primary winding 304 is essentially at the voltage at the midpoint between the capacitors, $V_B/2$. It is different from this only by the small and ac voltage that appears across the winding 315. The voltage across winding 304 is therefore approximately $-V_B/2$ during the first half of the cycle, which permits transformer T2 to reset. This reset will occur slightly before the next half cycle begins since the diode drop and resistive losses make the reverse voltage placed across the winding 304 slightly higher than the forward voltage was. Similarly, transformer T1 is reset when its magnetizing current flows through diode 307.

At the switch transitions, there is a brief overlap time when both switches are on at the same time to ensure that there is a path for the current of T3 to flow.

Since in this topology the primary windings of both transformers T1 and T2 are exposed to only $V_B/2$, instead of $V_B$, the number of primary turns they require is only half the number they would be for the isolation stage topologies shown in the '417 patent. Similarly, the switches 305 and 306, when they are off, are stressed to approximately $V_B$, instead of approximately $2V_B$. However, they carry twice the current when they are conducting because the primary winding has half the number of turns.

Figure 4:
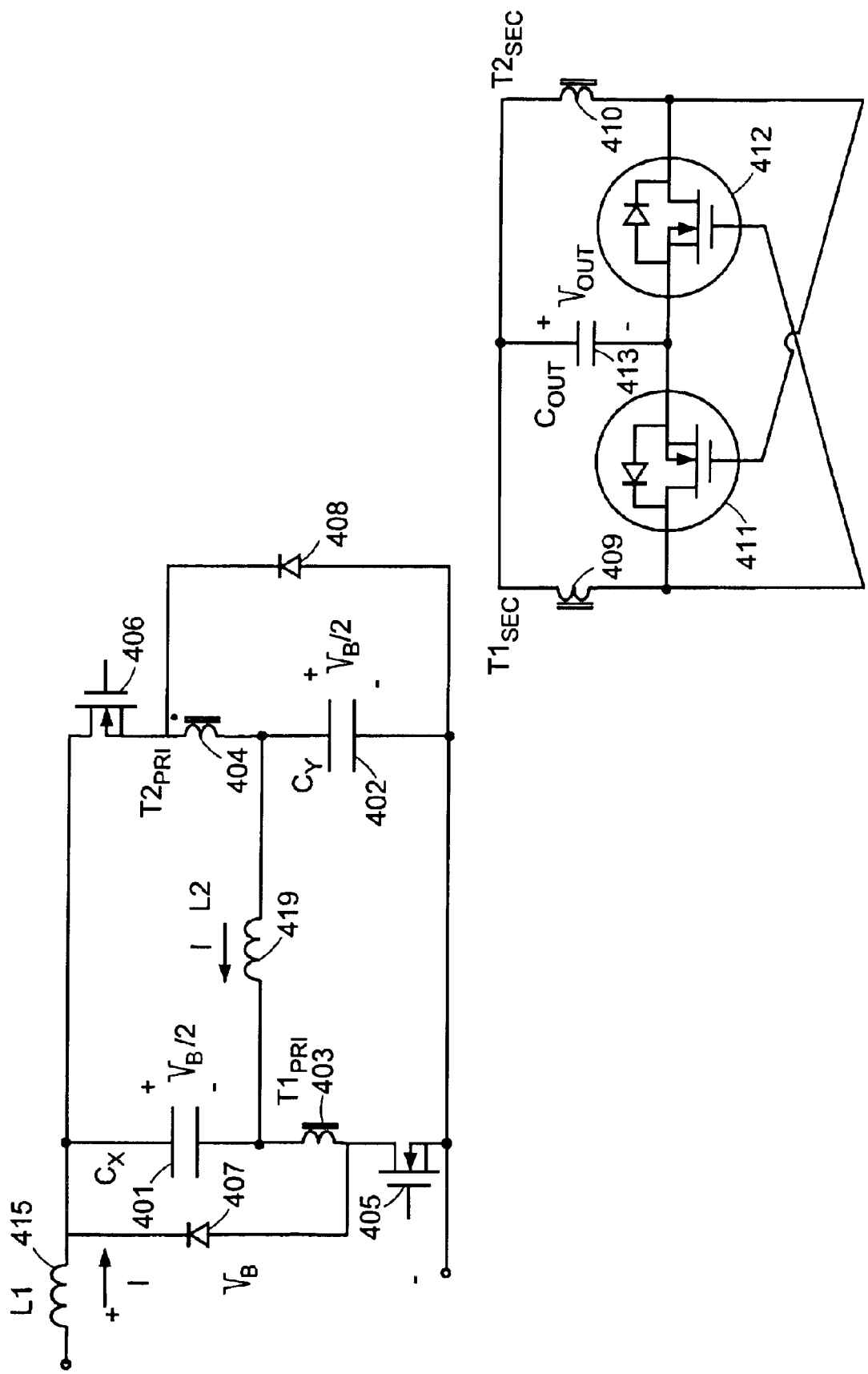
FIG. 4: Another Two-Transformer, Current-Fed, Half-Bridge Isolation Stage Topology.

FIG. 4 shows another new way to accomplish a half-bridge version of a current-fed, two-transformer isolation stage. In this topology the series combination of capacitor 401, primary winding 403, and switch 405 is connected in parallel with the reversed ordered series combination of switch 406, primary winding 404, and capacitor 402. The node where capacitor 201 and primary winding 403 are joined is then connected to the corresponding node where capacitor 202 and primary winding 404 are joined through an inductor, 414. The total circuit is then placed in series with another inductor 415. It is these two inductors 414 and 415 that provide the current-fed feature for the topology.

For purposes of understanding this topology, note that the DC current "I" flowing through inductor 415 and the DC current flowing through inductor 414 are equal. Also note that both capacitors 401 and 402 have a DC voltage of $V_B/2$ across them, where $V_B$ is the input voltage applied to the entire circuit.

The operation of the circuit is as follows. During the first half of the cycle, switch 405 is turned on and switch 406 is turned off. The current flowing through primary winding 403 and switch 405 is approximately 2I (to be exact, we should also acknowledge the ripple currents in the two inductors 414 and 415). The voltage across primary winding 403 is approximately $V_B/2$ (the difference is due to the ripple voltage across the capacitors). The current flowing into the primary winding is reflected to the secondary winding 409, where it flows through the controlled rectifier 411 to the output.

During the second half of the cycle, switch 406 is turned on and switch 405 is turned off. Now the current 2I flows through primary winding 404, and is reflected to the secondary winding 410, where it flows through the controlled rectifier 412 to the output. The voltage across winding 404 during this half cycle is approximately $V_B/2$.

During the half cycle that a transformer is not delivering current to the output, it has a negative voltage across it to reset its core. For instance, during the first half cycle when switch 406 is off, the magnetizing current of transformer T2 flows through diode 408, which connects the primary winding 404 across capacitor 402 in a negative manner so that it sees a voltage of $-V_B/2$. This negative voltage permits transformer T2 to reset. The reset will occur slightly before the next half cycle begins since the diode drop and resistive losses make the reverse voltage placed across the winding 404 slightly higher than the forward voltage was. Similarly, transformer T1 is reset when its magnetizing current flows through diode 407.

At the switch transitions, there is a brief overlap time when both switches are on at the same time to ensure that there is a path for the currents of inductors 414 and 415 to flow.

Since in this topology the primary windings of both transformers T1 and T2 are exposed to only $V_B/2$, instead of $V_B$, the number of primary turns they require is only half the number they would be for the isolation stage topologies shown in the '417 patent. Similarly, the switches 405 and 406, when they are off, are stressed to approximately $V_B$, instead of approximately $2V_B$. However, they carry twice the current when they are conducting because the primary winding has half the number of turns.

Figure 5:
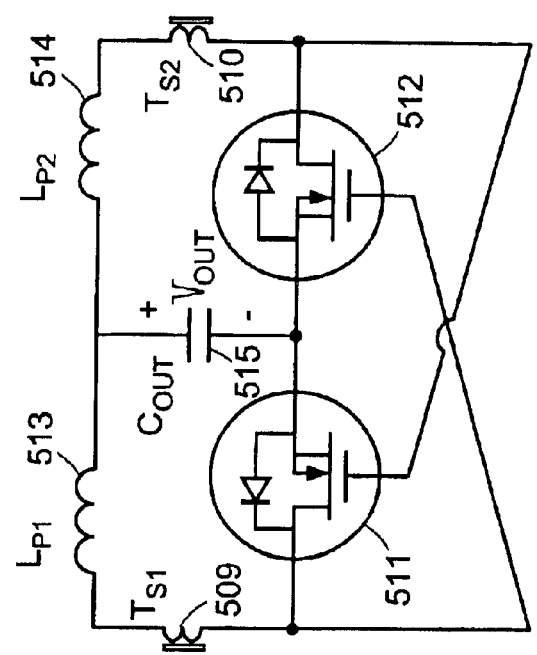
FIG. 5: A Single-Transformer, Voltage-Fed, Half-Bridge Isolation Stage Topology.
Figure 5:
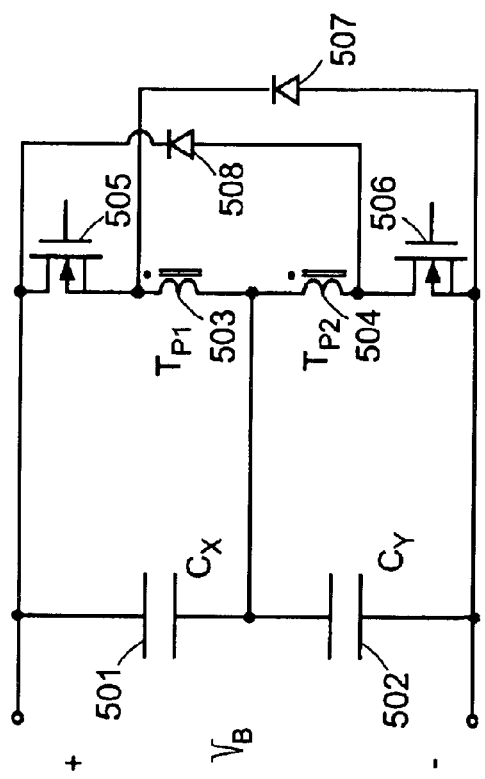

Note that the voltage-fed topology of FIG. 2 can be turned into a single-transformer, voltage-fed topology by combining all four windings on the same core and arranging the polarities of the winding appropriately, as shown in FIG. 5.

Figure 6:
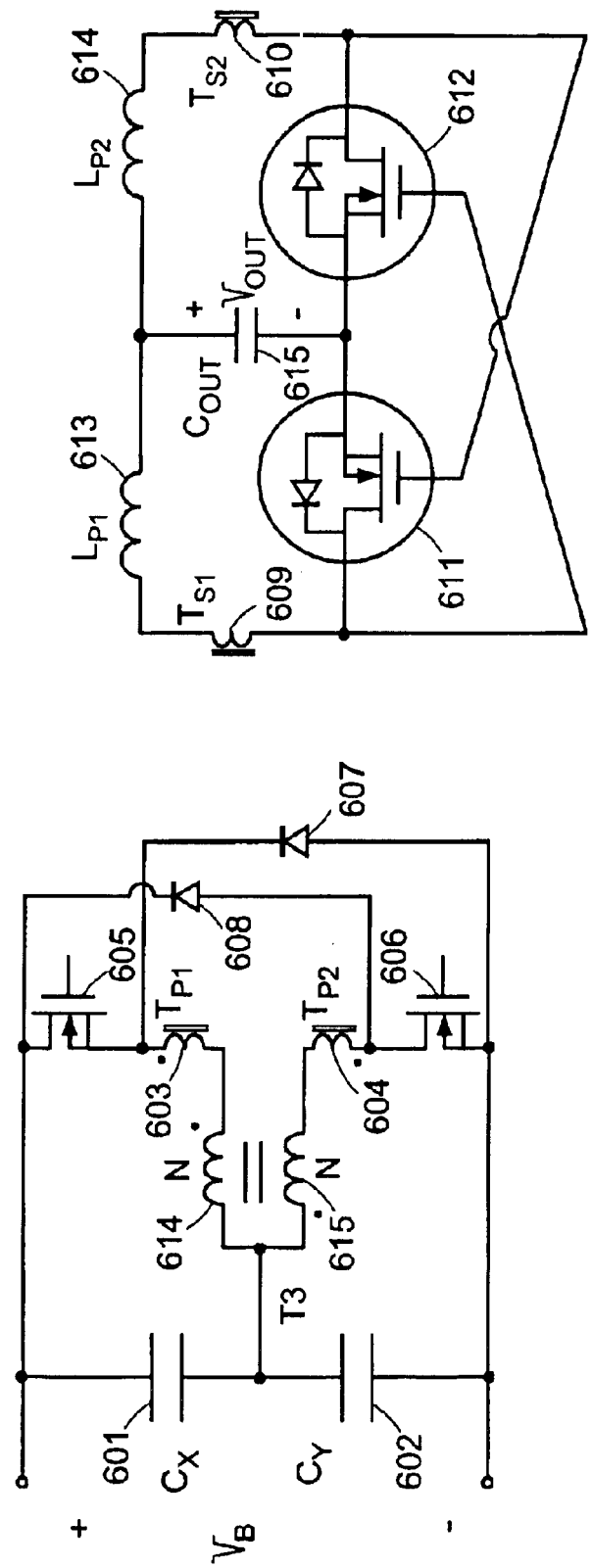
FIG. 6: A Single-Transformer, Current-Fed, Half-Bridge Isolation Stage Topology.
Figure 7:
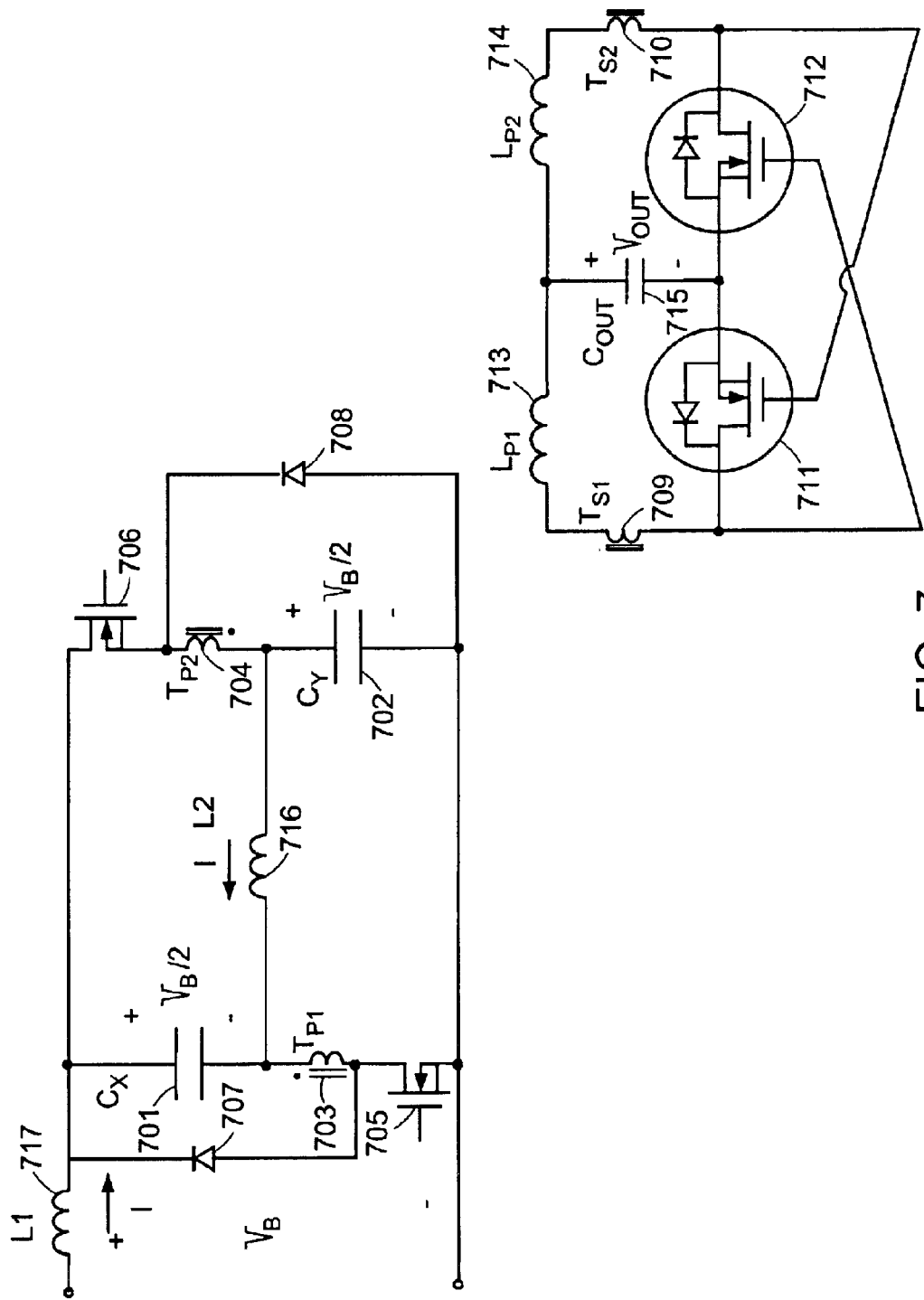
FIG. 7: Another Single-Transformer, Current-Fed, Half-Bridge Isolation Stage Topology.

Similarly, both of the current-fed topologies of FIGS. 3 and 4 can be turned into single-transformer, current-fed half-bridge topologies by placing the two primary and two secondary windings all on the same magnetic core and arranging the polarities of the windings appropriately, as shown in FIGS. 6 and 7.

In all of the topologies shown in FIGS. 5–7, current flows into one primary winding, $T_{P1}$, and out one secondary winding, $T_{S1}$, during the first half cycle. During the second half cycle, the current flows into the other primary winding, $T_{P2}$, and out the other secondary winding, $T_{S2}$.

Figure 8:
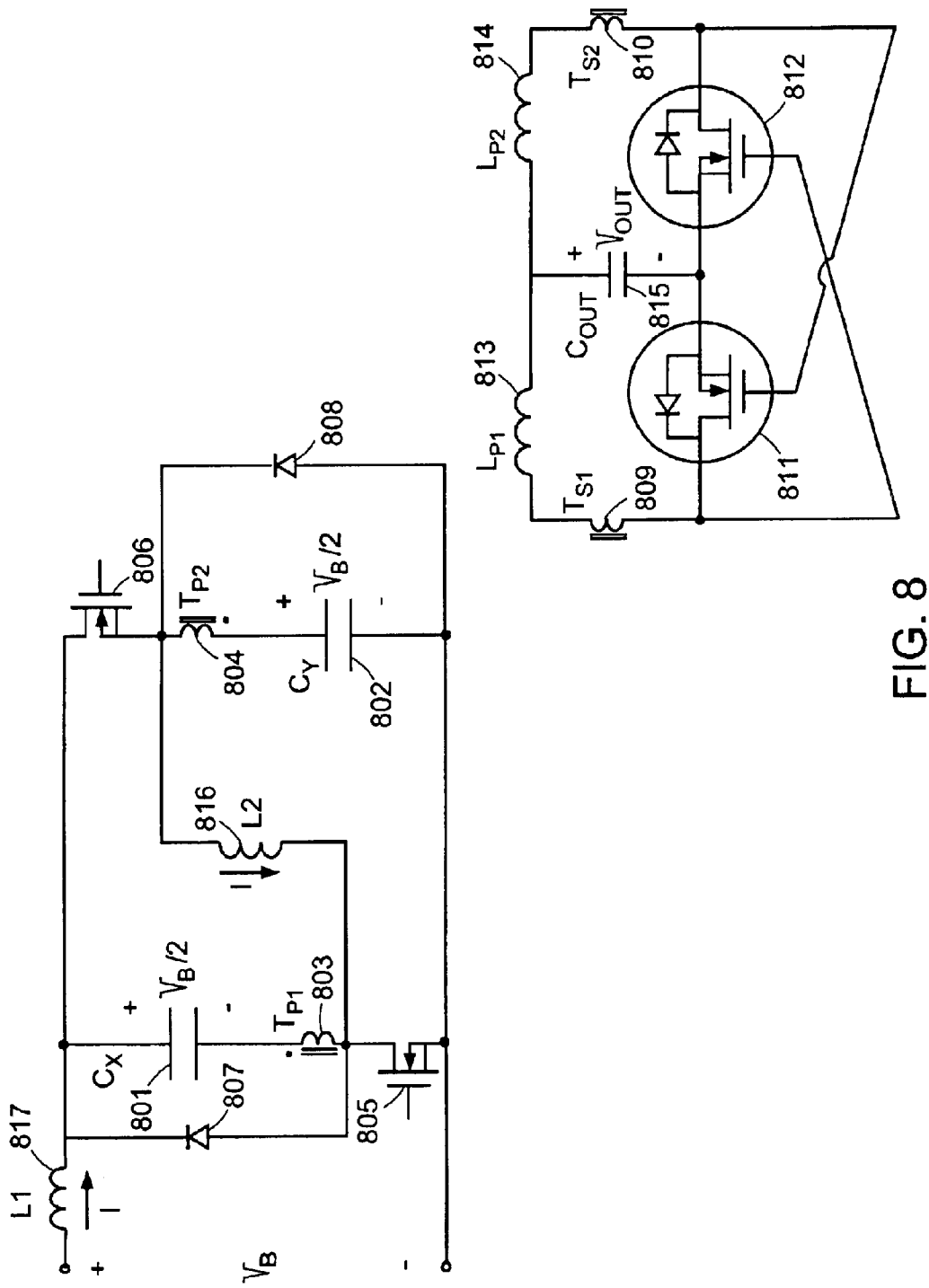
FIG. 8: A Single-Transformer, Current-Fed, Half-Bridge Isolation Stage Topology in which Current Flows Through Both Primary Windings during Both Halves of the Cycle.

Alternatively, the current-fed, single-transformer isolation stage of FIG. 8 could be used. This topology is similar to that shown in FIG. 7, except that inductor 814 is connected to different nodes in the circuit of FIG. 8 than is inductor 714 in the circuit of FIG. 7. With this alternate connection of the inductor, both primary windings of the single transformer carry current during both half cycles, thereby reducing the conductive losses in the transformer's primary winding by a factor of two.

This is accomplished as follows. During the first half cycle, switch 805 is on and switch 806 is off. The current I flowing through inductor 815 flows through capacitor 801, primary winding 403 (into the dot), and switch 805. Similarly, the current I flowing through inductor 814 flows through switch 805, capacitor 802, and primary winding 804 (into the dot). A current equal to 2I reflected by the primary to secondary turns ratio then flows through secondary winding 809 (out of the dot) to the output. During the second half cycle when switch 806 is on and switch 805 is off, the two primary windings both carry a current I in the opposite direction (out of the dot), and a current equal to 2I reflected by the turns ratio flows through secondary winding 810 (into the dot) to the output.

Note that in all of the single-transformer topologies shown in FIGS. 5–8, the two reset diodes (e.g. 407 and 408 in FIG. 4) have been included. Since the single transformer is driven with both a positive and a negative voltage over the course of a full cycle, it is no longer necessary to provide a path for the magnetizing current to flow during a reset half cycle, as it was for the two-transformer topologies. These reset diodes are therefore not needed, although they may still be applied to limit spikes in the voltage across a switch due to a leakage inductance.

As was explained in regard to the circuit of FIG. 9 in the '417 patent, the secondary windings of a single-transformer isolation stage would have to be loosely coupled to allow the switch transitions to be made if the control terminals of the controlled rectifiers are driven from signals derived from the secondary windings. Alternatively, the control terminals of the controlled rectifiers in a single-transformer isolation stage could be driven from signals derived from the control circuitry that controls the primary side switches. This control circuitry could be ground referenced to the primary side, or to the secondary side. For either case, the control signal could pass between the two sides of the power circuit through a typical signal-level isolation device 913 such as an opto-isolator or a transformer, as is well known in the art.

Once the control signals that synchronize the primary and secondary side switches are passed from one side of the isolation barrier to the other by means other than the main power transformer, it is no longer necessary to ensure that the two secondary windings of the isolation stage are loosely coupled. Therefore, in the single-transformer topologies shown in FIGS. 1 and 5–8 of this document (and in FIG. 9 of the '417 patent), the inductors $L_{P1}$ and $L_{P2}$, which represent the leakage and parasitic inductance that keeps the two secondary windings loosely coupled, are no longer needed. The secondary windings can, with this change in how the control signals are synchronized, be tightly coupled.

The topologies shown in this document are intended as half-bridge alternatives to the example isolation stage topologies shown in the '417 patent, where the duty cycle is fixed at approximately 50%, and the stage does not provide regulation. However, these topologies can, in general, also be used to provide regulation through the variation of their duty cycle. In particular, the current-fed topologies of FIGS. 3 and 4 (and their single transformer versions in FIGS. 6–8) can be operated under duty cycle control to regulate the output voltage. If controlled rectifiers are to be used, some other means for driving the control terminals, such as active gate drive circuitry, must be implemented. Or the topology could simply use uncontrolled rectifiers (i.e., diodes). These half-bridge current-fed topologies would then have the characteristics of an isolated up-converter, where the output voltage would equal $V_B/2$ times the turns ratio of the transformer(s) divided by (1-D), where D is the duty cycle.

While this invention has been particularly shown and described with references to preferred embodiments thereof, it will be understood by those skilled in the art that various changes in form and details may be made therein without departing from the spirit and scope of the inventions as defined by the appended claims. Those skilled in the art will recognize or be able to ascertain using no more than routine experimentation, many equivalents to the specific embodiments of the invention described specifically herein. Such equivalents are encompassed in the scope of the claims.

What is claimed is:

1. A current fed DC to DC power converter comprising:
   a primary circuit comprising:
      an input which receives an input voltage and an input current from a DC source;
      capacitors connected across the input and dividing the input voltage therebetween;
      transformer primary windings;
      switches which periodically switch the primary windings across respective capacitors; and
      current feed circuitry including a magnetic element distinct from the transformer primary windings and having DC current flow therethrough that constrains current flow through each primary winding as current flows through the winding; and
   a secondary circuit driven by the primary windings to provide a DC output, current flowing through a secondary winding as current flows through a respective primary winding.

2. A converter as claimed in claim 1 comprising two capacitors connected across the input, each capacitor charging to about one-half the input voltage.

3. A converter as claimed in claim 2 wherein each of the switches conducts about twice the input current.

4. A converter as claimed in claim 1 wherein transformer secondary windings of the secondary circuit are not tightly coupled.

5. A converter as claimed in claim 4 wherein first and second pairs of primary and secondary windings are provided on separate transformers.

6. A converter as claimed in claim 1 wherein the magnetic element is an inductor.

7. A converter as claimed in claim 1 wherein the magnetic element is a transformer.

8. A converter as claimed in claim 1 wherein current through the primary windings is constrained by a common component.

9. A converter as claimed in claim 1 further comprising a clamp coupled to each switch to limit voltage across the switch when the switch is turned off.

10. A converter as claimed in claim 9 wherein the clamp is a diode.

11. A converter as claimed in claim 1 wherein a capacitor, primary winding and switch are connected in series in different orders in each of plural legs across the input, the current feed circuitry including a current constraining component connecting nodes within each of respective legs.

12. A converter as claimed in claim 11 wherein the current constraining component is an inductor.

13. A converter as claimed in claim 12 wherein each leg includes a primary winding between a capacitor and switch.

14. A converter as claimed in claim 13 wherein the inductor connects nodes between the primary winding and capacitor of each leg.

15. A converter as claimed in claim 13 wherein the inductor connects nodes between the primary winding and switch of each leg.

16. A converter as claimed in claim 1 wherein the switches are turned on with a fixed duty cycle.

17. A converter as claimed in claim 1 wherein the secondary circuit comprises synchronous rectifiers.

18. A power converter comprising:
   an input which receives an input voltage and an input current from a DC source;
   a first circuit leg comprising a capacitor, transformer primary winding and switch connected in series across the input;
   a second circuit leg comprising a capacitor, transformer primary winding and switch connected in series across the input in an opposite order relative to the series connection of the first circuit leg;
   an inductor interconnecting like nodes of the first and second circuit legs; and
   a secondary circuit driven by the primary windings to provide a DC output.

19. A converter as claimed in claim 18 wherein the switches are turned on with a fixed duty cycle.

20. A converter as claimed in claim 18 wherein the secondary circuit comprises synchronous rectifiers.

21. A power converter as claimed in claim 18 wherein current flows through secondary winding as it flows through a respective primary winding.

22. A method of converting DC to DC voltage comprising:
   providing an input voltage and an input current at an input;
   dividing the input voltage across plural capacitors;
   periodically switching transformer primary windings across the capacitors;
   applying current of each of the primary windings through a magnetic element having DC current therethrough to constrain DC current flow through each primary winding as current flows through the winding; and
   driving a secondary circuit from the primary windings to provide an output, current flowing through a secondary winding as current flows through a respective primary winding.

23. A method as claimed in claim 22 wherein two capacitors are connected across the input, each capacitor charging to about one-half the input voltage.

24. A method as claimed in claim 23 wherein each of the switches conducts about twice the input current.

25. A method as claimed in claim 22 wherein transformer secondary windings of the secondary circuit are not tightly coupled.

26. A method as claimed in claim 25 wherein first and second pairs of primary and secondary windings are provided on separate transformers.

27. A method as claimed in claim 22 wherein the magnetic element is an inductor.

28. A method as claimed in claim 22 wherein the magnetic element is a transformer.

29. A method as claimed in claim 22 wherein current through the primary windings is constrained by a common component.

30. A method as claimed in claim 22 further comprising limiting voltage across the switch when the switch is turned off.

31. A method as claimed in claim 30 wherein the voltage is limited with a diode.

32. A method as claimed in claim 22 wherein a capacitor, primary winding and switch are connected in series in different orders in each of plural legs across the input, the current being constrained by a component connecting nodes within each of respective legs.

33. A method as claimed in claim 32 wherein the current constraining component is an inductor.

34. A method as claimed in claim 33 wherein each leg includes a primary winding between a capacitor and switch.

35. A method as claimed in claim 34 wherein the inductor connects nodes between the primary winding and capacitor of each leg.

36. A method as claimed in claim 34 wherein the inductor connects nodes between the primary winding and switch of each leg.

37. A method as claimed in claim 22 wherein the switches are turned on with a fixed duty cycle.

38. A method as claimed in claim 22 wherein the secondary circuit comprises synchronous rectifiers.

39. A method as claimed in claim 22 wherein current flow is constrained by distinct current feed circuitry coupled to the primary windings.

40. A current fed DC to DC power converter comprising:
   an input which receives an input voltage and an input current from a DC source;
   capacitors connected across the input and dividing the input voltage therebetween;
   transformer primary windings;
   switch means for periodically switching the primary windings across respective capacitors;
   current feed means having DC current flow therethrough that flows through each of the primary windings for constraining current flow through the primary windings; and
   a secondary circuit driven by the primary windings to provide a DC output, current flowing through a secondary winding as current flows through a respective primary winding.

* * * * *